(12) United States Patent
Li et al.

(10) Patent No.: US 10,078,237 B2
(45) Date of Patent: Sep. 18, 2018

(54) BACKPLANE STRUCTURE AND CURVED DISPLAY DEVICE

(71) Applicant: Shenzhen China Star Optoelectronics Technology Co., Ltd., Shenzhen, Guangdong (CN)

(72) Inventors: Dehua Li, Guangdong (CN); Gang Yu, Guangdong (CN); Yuchun Hsiao, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 181 days.

(21) Appl. No.: 15/108,307

(22) PCT Filed: May 13, 2016

(86) PCT No.: PCT/CN2016/082055
§ 371 (c)(1),
(2) Date: Jun. 26, 2016

(87) PCT Pub. No.: WO2017/185420
PCT Pub. Date: Nov. 2, 2017

(65) Prior Publication Data
US 2018/0101047 A1    Apr. 12, 2018

(30) Foreign Application Priority Data

Apr. 26, 2016 (CN) .......................... 2016 1 0263854

(51) Int. Cl.
*G02F 1/1333* (2006.01)
*F21V 8/00* (2006.01)

(52) U.S. Cl.
CPC ........ *G02F 1/133308* (2013.01); *G02B 6/005* (2013.01); *G02B 6/0055* (2013.01);
(Continued)

(58) Field of Classification Search
None
See application file for complete search history.

(56) References Cited

U.S. PATENT DOCUMENTS 9,766,487 B2 * 9/2017 Liu .................. G02F 1/133308
2009/0316062 A1 * 12/2009 Nishizawa ........ G02F 1/133305
349/58
(Continued)

FOREIGN PATENT DOCUMENTS

CN      104390118 A    3/2015
CN      104464530 U    3/2015
(Continued)

*Primary Examiner* — Britt D Hanley
(74) *Attorney, Agent, or Firm* — Andrew C. Cheng

(57) ABSTRACT

A backplane structure includes a backplane and a curved supporting frame. The curved supporting frame includes a first and a second region, wherein, a curvature radius of the second region is less than a curvature radius of the first region. The curvature radiuses of the supporting frame are evenly changed from the first region toward the second region. The backplane is a flat-thin sheet, and the supporting frame is installed at a surface of the backplane and bends the backplane to form a curved surface having an even curvature radius. A curved display device includes a display panel and a backplane structure. Different positions of the supporting frame provide different curvature radiuses to apply different supporting forces near or away from the supporting frame such that all positions of the backplane can maintain a target curvature radius. Curvature radiuses of the backplane structure and the curved display device are equal.

17 Claims, 3 Drawing Sheets

(52) U.S. Cl.
　　CPC ............ *G02F 2001/133314* (2013.01); *G02F 2001/133317* (2013.01); *G02F 2201/46* (2013.01); *G02F 2201/56* (2013.01)

(56) References Cited

U.S. PATENT DOCUMENTS

| | | | | |
|---|---|---|---|---|
| 2012/0281367 A1* | 11/2012 | He | ............... | H05K 5/02 |
| | | | | 361/728 |
| 2013/0002572 A1* | 1/2013 | Jin | ............... | G02F 1/133305 |
| | | | | 345/173 |
| 2013/0114193 A1* | 5/2013 | Joo | ............... | F16M 11/08 |
| | | | | 361/679.01 |
| 2013/0321740 A1* | 12/2013 | An | ............... | H05K 5/0217 |
| | | | | 349/58 |
| 2013/0329162 A1* | 12/2013 | Fujii | ............... | H05K 7/14 |
| | | | | 349/58 |
| 2014/0118910 A1* | 5/2014 | Sung | ............... | G09F 9/301 |
| | | | | 361/679.01 |
| 2016/0085110 A1 | 3/2016 | Shin et al. | | |
| 2016/0109647 A1* | 4/2016 | Hsiao | ............... | G02F 1/133308 |
| | | | | 349/58 |
| 2016/0278246 A1* | 9/2016 | Yu | ............... | G02F 1/133305 |
| 2016/0342014 A1* | 11/2016 | Liu | ............... | G02F 1/133308 |
| 2017/0374750 A1* | 12/2017 | Sun | ............... | H05K 5/0017 |

FOREIGN PATENT DOCUMENTS

| | | | |
|---|---|---|---|
| CN | 104965329 A | 10/2015 | |
| CN | 105044957 A | 11/2015 | |
| CN | 105118389 A | 12/2015 | |
| JP | H0933902 A | 2/1997 | |

\* cited by examiner

BACKPLANE STRUCTURE AND CURVED DISPLAY DEVICE

CROSS REFERENCE

The claims of this application have submitted to the State Intellectual Property Office of the People's Republic of China (SIPO) on Apr. 26, 2016, application Ser. No. 201610263854.8. The priority right based on the China application has a title of "Backplane structure and curved display device". The entire contents of the above-mentioned patent application will be incorporated in the present application through citing.

BACKGROUND OF THE INVENTION

1. Field of the Invention

The present invention relates to a display technology field, and more particularly to a backplane structure and a curved display device.

2. Description of Related Art

Along with the fast improve and development of the display technology, a curved display can not only be applied in a display device of a computer but also gradually applied in home life such as watching TV, performing visual entertainment of multimedia and so on. Because the ultra-thin design of the curved display device can give a strong visual impact for the consumer, the ultra-thin design has become a main development direction of the curved display device. A backplane structure of the curved display device will decide the entire thickness of the curved display device. Besides, the backplane structure is required having a certain strength to maintain the curvature radius to be even and unchanged. Therefore, the design of the backplane structure of the curved display device has become an important research topic of the curved display device.

In the conventional art, the backplane structure of the curved display device adopts a supporting frame having an unchanged curvature radius at every portion of the supporting frame to install in the bottom of the backplane to bend the backplane. However, a portion of the backplane that is near the supporting frame can maintain a target curvature radius, but a portion of the backplane that is away from the supporting frame will cancel a supporting force of the supporting frame because of the resilient force of the backplane such that the curvature radius of the backplane become small so that the curvature radius of an upper portion of backplane and the curvature radius of a lower portion of the backplane are unequal, which affects the installation of the display panel and the appearance of the entire curved display device.

SUMMARY OF THE INVENTION

In order to solve the above technology problem, on one aspect, the present invention provides a backplane structure, comprising: a backplane; a curved supporting frame including a first region and a second region, wherein, a curvature radius of the second region is less than a curvature radius of the first region, and curvature radiuses of the supporting frame are evenly changed from the first region toward the second region; wherein, the backplane is a flat-thin sheet, and the supporting frame is installed at a surface of the backplane and bends the backplane in order to form a curved surface having an even curvature radius distribution.

Wherein, the backplane includes a bottom edge and a top edge which are disposed oppositely, the supporting frame includes a first edge and a second edge which are disposed oppositely, the supporting frame is installed near the bottom edge, and the first edge is overlapped with the bottom edge.

Wherein, the first region is located at a terminal where the first edge of the supporting frame is located, the second region is located at a terminal where the second edge of the supporting frame is located, the curvature radiuses of the supporting frame are evenly decreased from the first edge to the second edge.

Wherein, the backplane includes a bottom edge, a top edge and a backplane midline; the bottom edge and the top edge are disposed oppositely and arranged at two sides of the backplane midline; a distance between the bottom edge and the backplane midline and a distance between the top edge and the backplane midline are the same; the supporting frame includes a first edge, a second edge and a frame midline; the first edge and the second edge are disposed oppositely and are arranged at two sides of the frame midline; a distance between the first edge and the frame midline and a distance between the second edge and the frame midline are the same; the supporting frame is installed at a middle location of the backplane; and the frame midline and the backplane midline are overlapped.

Wherein, the first region is located at a middle portion where the frame midline is located; the number of the second region is two; the two second regions are respectively located at two terminals where the first edge and the second edge which are opposite of the supporting frame are located; and the two second regions are symmetrically arranged at two sides of the first region; curvature radiuses of the supporting frame are evenly and respectively decreased from the frame midline to the first edge and the second edge of the supporting frame.

Wherein, the backplane structure utilizes multiple fixing parts to install the supporting frame on a surface of the backplane, the fixing part is a screw, a rivet, a double-sided adhesive, a pull rivet or a clip.

Wherein, the supporting frame and the backplane are contacted, at a location where the backplane and the supporting frame are contacted, through a cooperation of a protrusion and a groove, a positioning between the supporting frame and the backplane is achieved.

Wherein, a material of the supporting frame is stainless steel, aluminum alloy plate, electro-galvanized steel or hot dip galvanized steel.

On another aspect, the present invention provides a curved display device comprising a display panel and a backplane structure, wherein, the display panel comprising a reflective sheet, a light guide plate, an optical film and a liquid crystal glass sequentially connected, and the backplane structure is installed at a side of the display panel away from a display surface of the display panel.

Wherein, through a bonding, an embedding, a vacuum suction or a magnetic attraction method to connect the reflective sheet, a light guide plate, an optical film and a liquid crystal glass and the backplane structure, in order to form a display main body, and adopting a middle frame and a front frame to fix the display main body.

The beneficial effects of the present invention are: different positions of the supporting frame provide different curvature radiuses to apply different supporting forces near or away from the supporting frame such that all positions of the backplane can maintain a target curvature radius. Curvature radiuses of the backplane structure and the curved display device are the same, and the appearance is beautiful.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
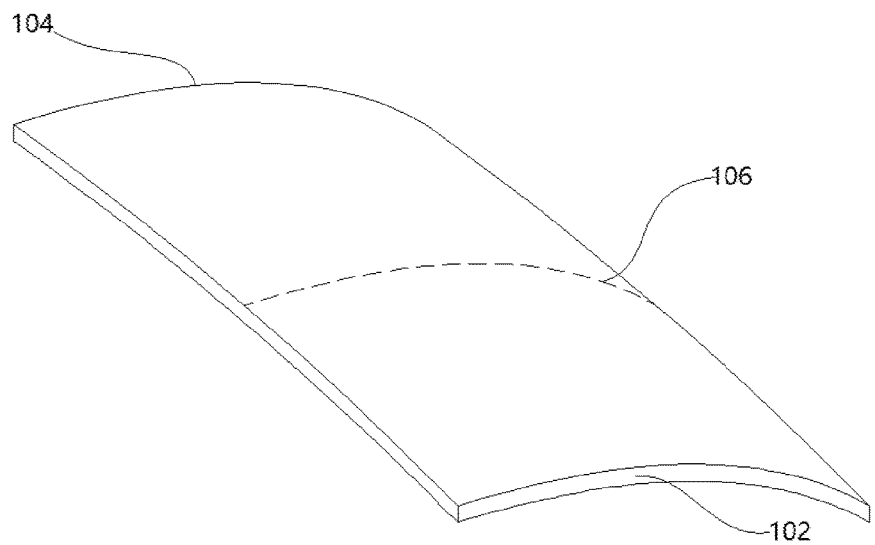
FIG. 1 is a schematic diagram of a backplane of a backplane structure provided by a first embodiment of the present invention.

FIG. 1 is a schematic diagram of a backplane of a backplane structure provided by a first embodiment of the present invention. As shown in FIG. 1, the backplane 10 is a flat-thin sheet. The backplane 10 includes a bottom edge 102, a top edge 104 and a backplane midline 106. The bottom edge 102 and the top edge 104 are disposed oppositely and arranged at two sides of the backplane midline 106, and a distance between the bottom edge 102 and the backplane midline 106 and a distance between the top edge 104 and the backplane midline 106 are the same. In one embodiment, the material of the backplane 10 is a flat-thin sheet made of epoxy resin. Of course, the material of the backplane 10 can also be epoxy resin, glass, steel, metal, polymer film, ceramic or carbon fiber. A surface of the backplane 10 is bent to be a curved surface having an even curvature radius after installing the supporting frame 20.

Figure 2:
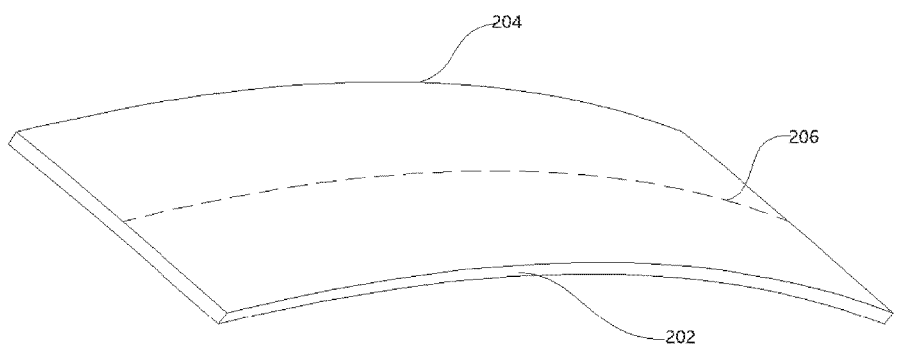
FIG. 2 is schematic diagram of a supporting frame provided by a first embodiment of the present invention.

FIG. 2 is a schematic diagram of a supporting frame provided by a first embodiment of the present invention. As shown in FIG. 2, the supporting frame 20 is a curved structure. The supporting frame 20 includes a first edge 202, a second edge 204 and a frame midline 206. The first edge 202 and the second edge 204 are disposed oppositely and are arranged at two sides of the frame midline 206. A distance between the first edge 202 and the frame midline 206 and a distance between the second edge 204 and the frame midline 206 are the same. One terminal where the first edge 202 of the supporting frame 20 is located is disposed as a first region, and disposed a curvature radius of the first region as R; one terminal where the second edge 204 of the supporting frame 20 is located is disposed as a second region, and disposed a curvature radius of the second region as (R−R0). The curvature radiuses of the supporting frame are evenly changed from the first region toward the second region. That is, the curvature radiuses of the supporting frame 20 are evenly decreased from the first edge 202 to the second edge 204. In one embodiment, the supporting frame 20 is a stainless steel. Of course, the supporting frame 20 is an aluminum alloy plate, an electro-galvanized steel or a hot dip galvanized steel.

Figure 3:
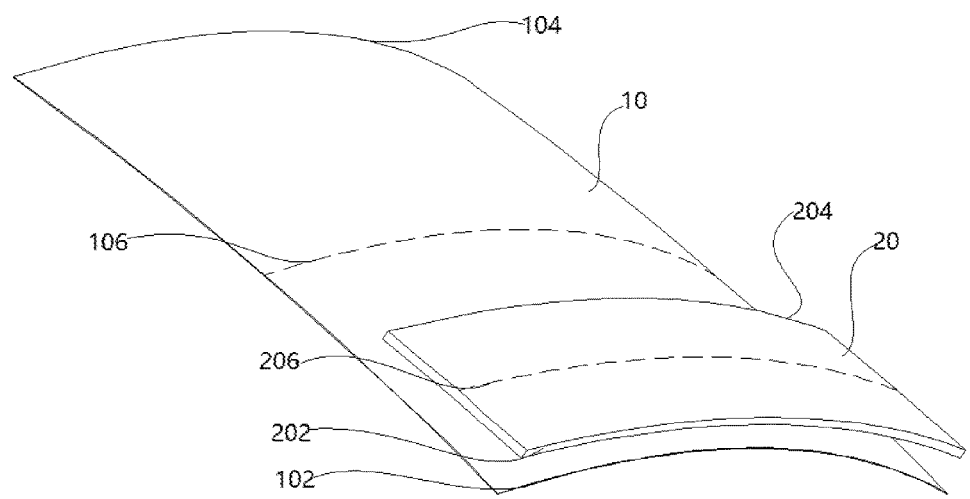
FIG. 3 is a schematic diagram of a backplane structure provided by a first embodiment of the present invention.

With reference to FIG. 3, the supporting frame 20 utilizes multiple fixing parts to install to a side of the backplane 10 near the bottom edge 102. The first edge 202 and the bottom edge 102 are overlapped. The supporting frame 20 bends the backplane 10 to form a curved surface. Wherein, each fixing part is a screw, a rivet, a double-sided adhesive, a pull rivet or a clip. After the backplane 10 is bent by the supporting frame 20, theoretically, the curvature radius and changing tendency and of each position of the bottom edge is closed to the curvature radius of the supporting frame, a theoretical value of the curvature radius of the bottom edge 102 is R, a theoretical value of the curvature radius of the top edge 104 is (R−R1), wherein, the value of R1 is affected by the value of R0. Because of the resilience of the backplane 10, a side away from the supporting frame 20, that is the resilient force of the top edge 104 cancels out a portion of the supporting force provided by the supporting frame 20 such that an actual curvature radius of the top edge 104 of the backplane 10 is (R−R1+R2), and the curvature radius of the bottom edge 102 is R.

Through adopting CAE simulation technology to obtain the value of R0 such that the values of R1 and R2 are canceled each other, the curvature radiuses of the bottom edge 102 and the top edge 104 of the backplane 10 are similar to a target curvature radius R such that curvature radiuses of all positions of the backplane 10 are even and approximately equal.

The backplane structure of the supporting frame 20 provided by the first embodiment of the present invention is installed at a side of the backplane 10 near the bottom edge 102. Through disposing the first region of the supporting frame 20 to a terminal where the first edge 202 of the supporting frame 20 is located. The second region is disposed at a terminal where the second edge 204 of the supporting frame 20 is located. Using a difference value of the curvature radiuses of the first edge 204 and the second edge 204 to eliminate a change of curvature at the top edge 104 of the backplane 10 because of resilient property such that curvatures at all positions of the backplane 10 are even and equal for assembling a slim and even curvature curved display device, and providing a backplane structure for beautiful appearance and satisfying an usage requirement.

Figure 4:
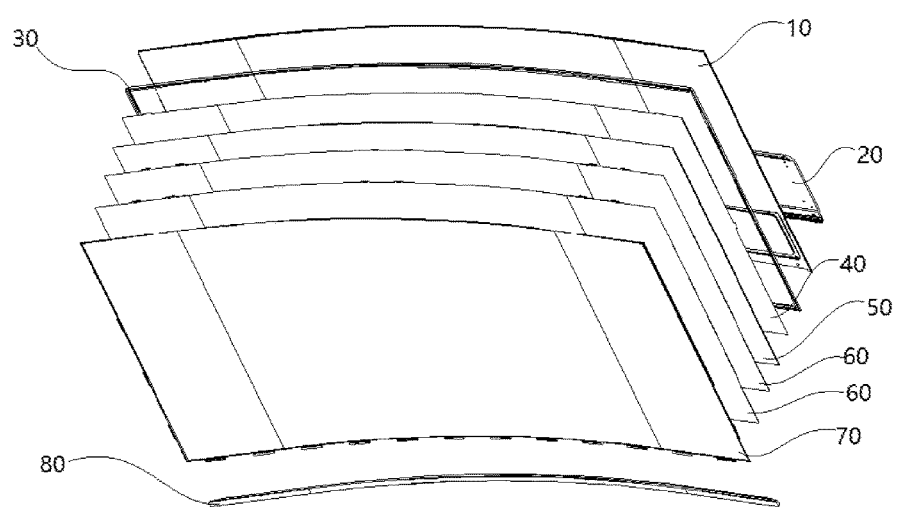
FIG. 4 is schematic diagram of a curved display device provided by a first embodiment of the present invention.

FIG. 4 is schematic diagram of a curved display device provided by a first embodiment of the present invention. As shown in the figure, the curved display device is formed by assembling a backplane structure and a display panel provided by the first embodiment of the present invention. The display panel includes a reflective sheet 40, a light guide plate 50, an optical film 60 and a liquid crystal glass 70. Through a bonding, an embedding, a vacuum suction or a magnetic attraction method to connect the display panel and the backplane structure in order to form a display main body, and adopting a middle frame 30 and a front frame 80 to fix the display main body.

The curved display device provided by the first embodiment of the present invention can satisfy an ultra-thin design requirement, effectively improving the curvature uneven problem caused by the resilience of the ultra-thin backplane. The backplane is directly designed as an appearance part so that the device has a beautiful appearance, and gives a strong visual impact.

Figure 5:
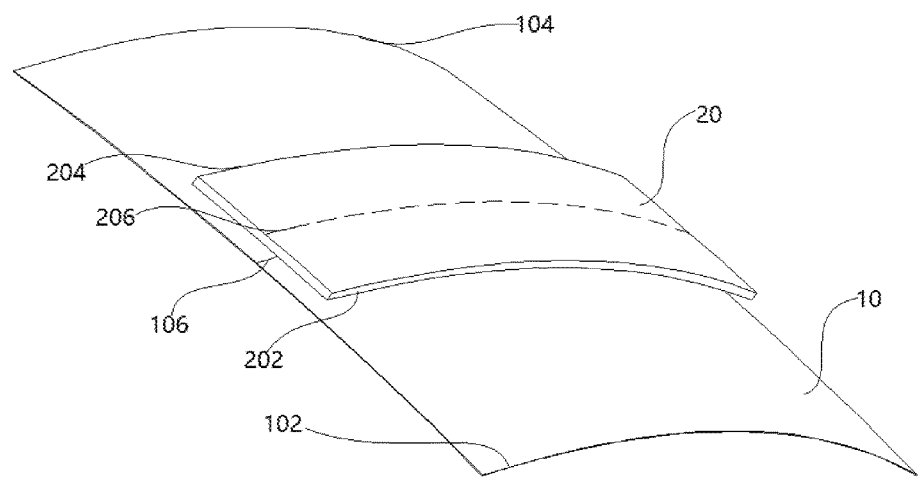
FIG. 5 is a schematic diagram of a backplane structure provided by a second embodiment of the present invention.

FIG. 5 is a schematic diagram of a backplane structure provided by a second embodiment of the present invention. As shown in the figure, comparing to the first embodiment, the supporting frame 20 is installed at a middle location of the backplane 10 and the frame midline 206 and the backplane midline 106 are overlapped. A middle portion where the frame midline 206 of the supporting frame 20 is located is disposed as a first region, and disposed a curvature radius of the first region as R. The number of the second region is two. The two second regions are respectively located at two terminals where the first edge 202 and the second edge 204 which are opposite of the supporting frame 20 are located, and are symmetrically distributed at two sides of the first region, and disposed the curvature radius of the second region as (R−R0). The curvature radiuses of the supporting frame 20 are decreased respectively from the frame midline 206 to the first edge 202 and the second edge 204.

After the backplane 10 is bent by the supporting frame 20, theoretically, the curvature radius and changing tendency and of each position of the backplane 10 is closed to the curvature radius of the supporting frame 20. That is, when a theoretical value of a curvature radius of the backplane midline 106 is R, each of theoretical values of curvature radiuses of the bottom edge 102 and the top edge 104 is (R−R1), wherein, the value of R1 is affected by the value of R0. Because of the resilience of the backplane 10, sides away from the supporting frame 20, that is, the resilience of the bottom edge 102 and the top edge 104 cancel out a portion of a supporting force provided by the supporting frame 20 such that an actual curvature radiuses of each of the bottom edge 102 and the top edge 104 of the backplane 10 is (R−R1+R2), and the curvature radius of the backplane midline 106 is R.

Through adopting CAE simulation technology to obtain the value of R0 such that the values of R1 and R2 are canceled each other, each of the curvature radiuses of the bottom edge 102, the top edge 104 and the backplane midline 106 of the backplane 10 approximately reach a target curvature radius R such that curvature radiuses of all positions of the backplane 10 are even and approximately equal.

Figure 6:
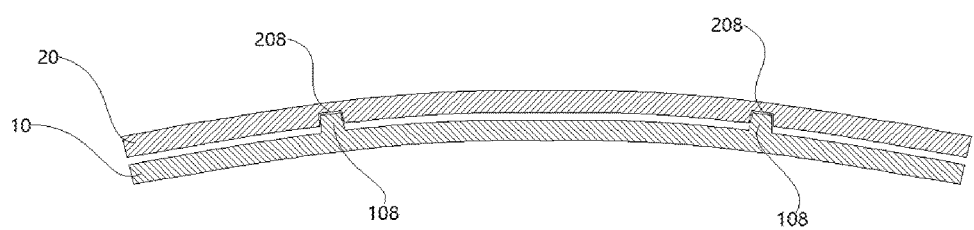
FIG. 6 is a cross-sectional view at a location of a backplane midline of the backplane structure provided by a second embodiment of the present invention.

The backplane structure provided by the second embodiment of the present invention installs the supporting frame 20 to the middle location of the backplane 10. The frame midline 206 and the backplane midline 106 are overlapped. Through disposing the middle portion where the frame midline 206 is located as the first region. Two second regions are respectively located at two terminals of the first edge 202 and the second edge 204 which are opposite of the supporting frame 20. Using a difference value between curvature radiuses of the first edge 202 and second edge 204 with respect to the frame midline 206 to cancel the curvature change caused by the resilience of the bottom edge 102 and the top edge 104 of the backplane 10 such that the curvature radiuses of all positions of the backplane 10 are even and equal to provide a backplane structure having beautiful appearance and satisfying the usage requirement for assembling an ultra-thin and even curvature curved display device In one embodiment, at a location where the backplane 10 and the supporting frame 20 are contacted, a surface of the backplane 10 is provided with two symmetrical protrusions 108, and a surface of the supporting frame 20 is provided with two symmetrical grooves 208. The protrusions 108 and the grooves 208 are matched such that the supporting frame 20 and the backplane 10 are located with each other. FIG. 6 is a cross-sectional view of the backplane structure at the frame midline 206 and the backplane midline 106 provided by a second embodiment of the present invention. As shown in the figure, the two protrusions 108 and the two grooves 208 are matched with each other to fix a relative location of the backplane 10 and the supporting frame 20. The design of the protrusions 108 and the grooves 208 is beneficial for the supporting frame 20 to bend the backplane 10 as a preset curved surface and maintain the curvature of the backplane 10, and beneficial for positioning in the assembly process of the supporting frame 20 and the backplane 10 at the same time.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A backplane structure, comprising:
a backplane; and
a curved supporting frame including a first region and a second region, wherein, a curvature radius of the second region is less than a curvature radius of the first region, and curvature radiuses of the supporting frame are evenly changed from the first region toward the second region;
wherein, the backplane is a flat-thin sheet, and the supporting frame is installed at a surface of the backplane and bends the backplane in order to form a curved surface having an even curvature radius distribution.

2. The backplane structure according to claim 1, wherein, the backplane includes a bottom edge and a top edge which are disposed oppositely, the supporting frame includes a first edge and a second edge which are disposed oppositely, the supporting frame is installed near the bottom edge, and the first edge is overlapped with the bottom edge.

3. The backplane structure according to claim 2, wherein, the first region is located at a terminal where the first edge of the supporting frame is located, the second region is located at a terminal where the second edge of the supporting frame is located, the curvature radiuses of the supporting frame are evenly decreased from the first edge to the second edge.

4. The backplane structure according to claim 1, wherein, the backplane includes a bottom edge, a top edge and a backplane midline; the bottom edge and the top edge are disposed oppositely and arranged at two sides of the backplane midline; a distance between the bottom edge and the backplane midline and a distance between the top edge and the backplane midline are the same; the supporting frame includes a first edge, a second edge and a frame midline; the first edge and the second edge are disposed oppositely and are arranged at two sides of the frame midline; a distance between the first edge and the frame midline and a distance between the second edge and the frame midline are the same; the supporting frame is installed at a middle location of the backplane; and the frame midline and the backplane midline are overlapped.

5. The backplane structure according to claim 4, wherein, the first region is located at a middle portion where the frame midline is located; the number of the second region is two; the two second regions are respectively located at two terminals where the first edge and the second edge which are opposite of the supporting frame are located; and the two second regions are symmetrically arranged at two sides of the first region; curvature radiuses of the supporting frame are evenly and respectively decreased from the frame midline to the first edge and the second edge of the supporting frame.

6. The backplane structure according to claim 1, wherein, the backplane structure utilizes multiple fixing parts to install the supporting frame on a surface of the backplane, the fixing part is a screw, a rivet, a double-sided adhesive, a pull rivet or a clip.

7. The backplane structure according to claim 1, wherein, the supporting frame and the backplane are contacted, at a location where the backplane and the supporting frame are contacted, through a cooperation of a protrusion and a groove, a positioning between the supporting frame and the backplane is achieved.

8. The backplane structure according to claim 1, wherein, a material of the supporting frame is stainless steel, aluminum alloy plate, electro-galvanized steel or hot dip galvanized steel.

9. A curved display device comprising a display panel and a backplane structure, wherein, the display panel comprising a reflective sheet, a light guide plate, an optical film and a liquid crystal glass sequentially connected, and the backplane structure is installed at a side of the display panel away from a display surface of the display panel;
wherein the backplane structure comprises a backplane; and a curved supporting frame including a first region and a second region, wherein, a curvature radius of the second region is less than a curvature radius of the first region, and curvature radiuses of the supporting frame are evenly changed from the first region toward the second region; wherein, the backplane is a flat-thin sheet, and the supporting frame is installed at a surface of the backplane and bends the backplane in order to form a curved surface having an even curvature radius distribution.

10. The curved display device according to claim 9, wherein, the backplane includes a bottom edge and a top edge which are disposed oppositely, the supporting frame includes a first edge and a second edge which are disposed oppositely, the supporting frame is installed near the bottom edge, and the first edge is overlapped with the bottom edge.

11. The curved display device according to claim 10, wherein, the first region is located at a terminal where the first edge of the supporting frame is located, the second region is located at a terminal where the second edge of the supporting frame is located, the curvature radiuses of the supporting frame are evenly decreased from the first edge to the second edge.

12. The curved display device according to claim 9, wherein, the backplane includes a bottom edge, a top edge and a backplane midline; the bottom edge and the top edge are disposed oppositely and arranged at two sides of the backplane midline; a distance between the bottom edge and the backplane midline and a distance between the top edge and the backplane midline are the same; the supporting frame includes a first edge, a second edge and a frame midline; the first edge and the second edge are disposed oppositely and are arranged at two sides of the frame midline; a distance between the first edge and the frame midline and a distance between the second edge and the frame midline are the same; the supporting frame is installed at a middle location of the backplane; and the frame midline and the backplane midline are overlapped.

13. The curved display device according to claim 12, wherein, the first region is located at a middle portion where the frame midline is located; the number of the second region is two; the two second regions are respectively located at two terminals where the first edge and the second edge which are opposite of the supporting frame are located; and the two second regions are symmetrically arranged at two sides of the first region; curvature radiuses of the supporting frame are evenly and respectively decreased from the frame midline to the first edge and the second edge of the supporting frame.

14. The curved display device according to claim 9, wherein, the backplane structure utilizes multiple fixing parts to install the supporting frame on a surface of the backplane, the fixing part is a screw, a rivet, a double-sided adhesive, a pull rivet or a clip.

15. The curved display device according to claim 9, wherein, the supporting frame and the backplane are contacted, at a location where the backplane and the supporting frame are contacted, through a cooperation of a protrusion and a groove, a positioning between the supporting frame and the backplane is achieved.

16. The curved display device according to claim 9, wherein, a material of the supporting frame is stainless steel, aluminum alloy plate, electro-galvanized steel or hot dip galvanized steel.

17. The curved display device according to claim 9, wherein, through a bonding, an embedding, a vacuum suction or a magnetic attraction method to connect the reflective sheet, a light guide plate, an optical film and a liquid crystal glass and the backplane structure, in order to form a display main body, and adopting a middle frame and a front frame to fix the display main body.

\* \* \* \* \*